United States Patent
Gukal et al.

(10) Patent No.: US 9,559,893 B2
(45) Date of Patent: Jan. 31, 2017

(54) CONTROLLING ACTIVE WARNING LEVELS BASED ON PERFORMANCE STATISTICS FOR COMBINATIONS OF DIFFERENT TYPES OF CHARACTERISTIC DIMENSIONS AND VALUES REPORTED BY USER TERMINAL APPLICATIONS

(71) Applicant: CA, Inc., New York, NY (US)

(72) Inventors: Sreenivas Gukal, Santa Clara, CA (US); Sanjay Vyas, Fremont, CA (US); Rammohan Varadarajan, Cupertino, CA (US)

(73) Assignee: CA, Inc., New York, NY (US)

( * ) Notice: Subject to any disclaimer, the term of this patent is extended or adjusted under 35 U.S.C. 154(b) by 209 days.

(21) Appl. No.: 14/569,953

(22) Filed: Dec. 15, 2014

(65) Prior Publication Data

US 2016/0173321 A1    Jun. 16, 2016

(51) Int. Cl.
*G06F 15/173*    (2006.01)
*H04L 12/24*    (2006.01)
*H04L 12/26*    (2006.01)
*H04M 15/00*    (2006.01)
*H04W 4/00*    (2009.01)

(52) U.S. Cl.
CPC ........... *H04L 41/064* (2013.01); *H04L 43/067* (2013.01); *H04L 43/16* (2013.01); *H04M 15/85* (2013.01); *H04W 4/003* (2013.01)

(58) Field of Classification Search
CPC ......... H04L 43/16; H04L 43/06; H04M 15/85; H04W 4/00
USPC ....................................................... 709/224
See application file for complete search history.

(56) References Cited

U.S. PATENT DOCUMENTS

| | | | | |
|---|---|---|---|---|
| 8,997,081 | B1 * | 3/2015 | Manion | G06F 8/65 717/168 |
| 2012/0036498 | A1 * | 2/2012 | Akirekadu | G06F 11/3495 717/124 |
| 2013/0258865 | A1 * | 10/2013 | Kovvali | H04W 24/10 370/241 |

* cited by examiner

*Primary Examiner* — Glenford Madamba
(74) *Attorney, Agent, or Firm* — Myers Bigel, P.A.

(57) ABSTRACT

An application analysis computer obtains reports from user terminals containing application performance metrics and dimensions having values characterizing the applications and the user terminals. Statistics for each different type of the performance metrics across the reports are generated. One of the statistics, for one type of the performance metrics, that has changed at least a threshold amount between two time intervals is identified, and that performance metric is selected for analysis. For each combination of a different type of the characteristic dimensions and a different value among the values occurring for the type of the characteristic dimension, a statistic is generated for the selected type of the performance metrics from the reports. Information is communicated based on an active warning ID that was selected based on being associated with a combination of the type of the characteristic dimension and one of the statistics that changed at least a threshold amount.

20 Claims, 5 Drawing Sheets

US 9,559,893 B2

CONTROLLING ACTIVE WARNING LEVELS BASED ON PERFORMANCE STATISTICS FOR COMBINATIONS OF DIFFERENT TYPES OF CHARACTERISTIC DIMENSIONS AND VALUES REPORTED BY USER TERMINAL APPLICATIONS

BACKGROUND

The present disclosure relates to computing systems, and, in particular, to management of user terminals, applications, and/or application servers.

Increasingly, users install a myriad of different types of application programs (also commonly referred to as "applications" and "apps") on user terminals having widely varying software and hardware characteristics. For example, users can select from among several million different applications available on various application servers for downloading to cellular telephones (sometimes called "smart phones"), tablet computers, laptop computers, and other types of user terminals for processing. Over a billion Apple IOS user terminals and Android user terminals are presently being used throughout the world.

Mobile analytics is an emerging technology that seeks to measure performance of applications processed by user terminals. Through mobile analytics processes, user terminals can collectively generate millions of performance reports every day for processing by an analysis computer. Analysis of the performance reports can require expensive and complex hardware and software resources and the analysis can be prone to excessive error or reduced usefulness due to the tremendous number of combinations of differing application characteristics and user terminal characteristics from which individual reports are generated.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a computer program product that includes a non-transitory computer readable storage medium including computer readable program code embodied in the medium that when executed by a processor of an application analysis computer causes the processor to perform operations. The operations include obtaining from user terminals, reports containing performance metrics for applications processed by user terminals and characteristic dimensions having values characterizing the applications and the user terminals. A statistic is generated separately for each different type of the performance metrics across the reports. One of the statistics is identified for one type of the performance metrics that has changed at least a threshold amount between two time intervals. The one type of the performance metrics is selected for analysis. For each combination of a different type of the characteristic dimensions and a different value among the values occurring for the type of the characteristic dimension, the operations include generating a statistic for the selected type of the performance metrics from the reports, within a time interval, having the combination of the type of the characteristic dimension and the value, and incrementing a counter that tracks a number of occurrences of the combination of the type of the characteristic dimension and the value among the reports. One of the statistics is identified, for the selected type of the performance metrics from the reports within the time interval having the combination of the type of the characteristic dimension and the value, that has changed at least a threshold amount between the time interval and a previous time interval. Searching is performed in a list of active warning IDs to identify one of the active warning IDs associated with the combination of the type of the characteristic dimension and the value for the identified statistic. Information is communicated based on the identified one of the active warning IDs.

Other computer program products, methods, and systems according to embodiments of the present disclosure will be or become apparent to one with skill in the art upon review of the following drawings and detailed description. It is intended that all such additional computer program products, methods, and systems be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to improved processes for analyzing performance metrics reported by user terminals. Although the reports can be received from a tremendous number of combinations of differing application characteristics and user terminal characteristics, various embodiments disclosed herein may operate to generate and organize the performance metrics from the reports in ways that facilitate use of less expensive and/or reduced complexity hardware and software resources.

Figure 1:
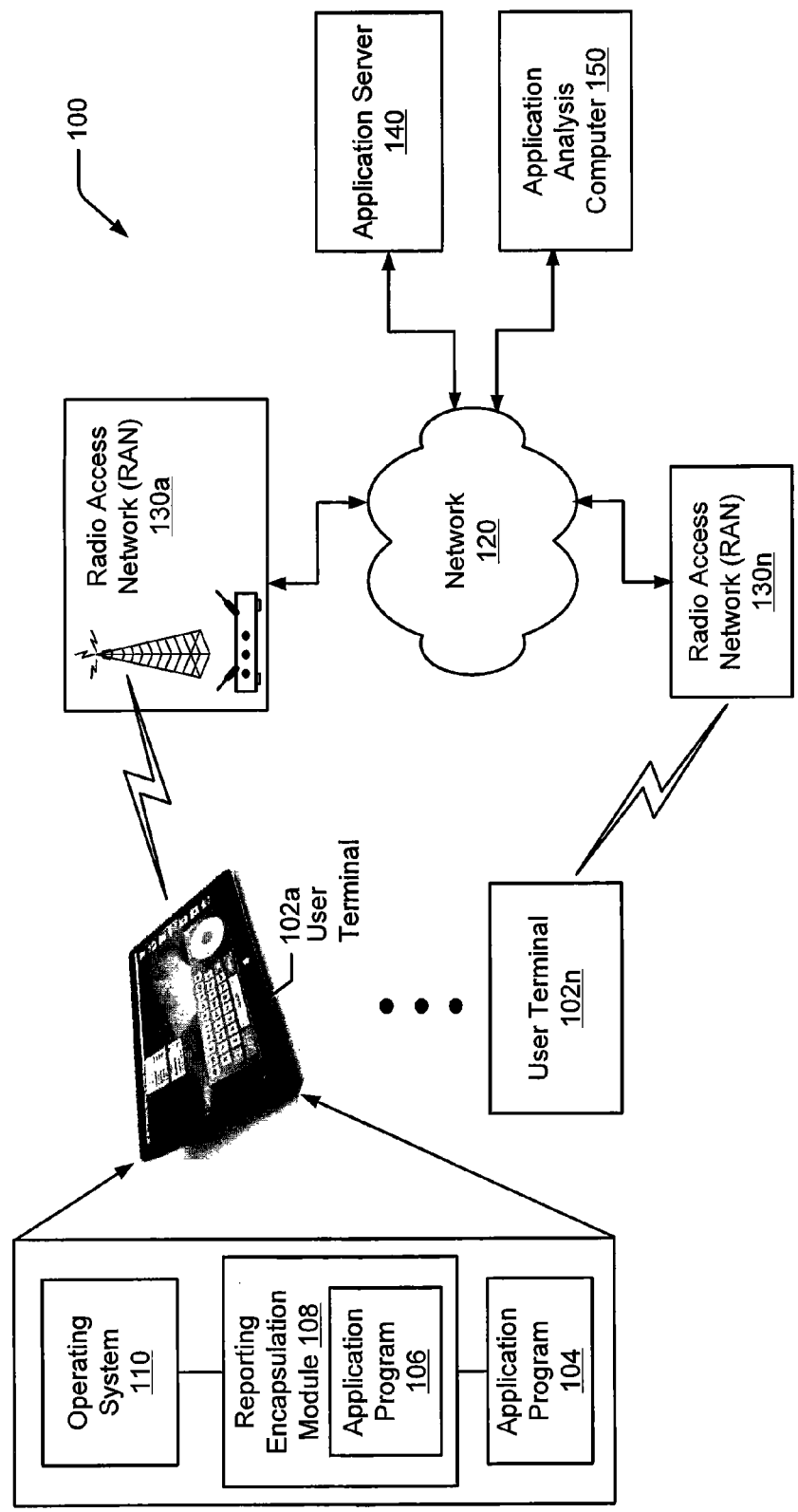
FIG. 1 is a block diagram of a system for analyzing operation of applications processed by user terminals using statistics generated from reported performance metrics, in accordance with some embodiments of the present disclosure.

FIG. 1 is a block diagram of a system 100 for analyzing operation of applications processed by user terminals using reported performance metrics and statistics generated from selected performance metrics associated with combinations of different characteristic dimensions and different values among the reports, in accordance with some embodiments of the present disclosure. The system 100 includes an application analysis computer 150 which receives reports from user terminals 102a-n through wireless network communications (e.g., radio access networks (RAN) 130a-130n) and/or wired network communications via a data network 120. The data network 120 may be a private network and/or a public network such as the Internet. One or more of the user terminals 102a-102n may communicate through the radio access networks 130a-130n using one or more wireless communication protocols that may include, but are not limited to, 3GPP Long Term Evolution (LTE), WLAN (IEEE 802.11), WiMax, Bluetooth, etc.

The user terminals 102a-102n can download application programs from the application server 140. The application server 140 may, for example, include an Apple application store server (e.g., iTunes), an Android application store server (e.g., Google Play and/or Amazon Appstore), and/or a Window application store server (e.g., Microsoft Windows Store). Although the application analysis computer 150 has been illustrated as being separate from the application server 140, some or all of the functionality of the application analysis computer 150 disclosed herein may be combined with the application server 140 or another computer node ("network node") communicatively connected to the network 120.

The application programs may include gaming programs, spreadsheet programs, multimedia programs, word processing programs, database programs, presentation programs, etc. The application programs may be selected from among several million different applications available from application servers for downloading to many different types of user terminals. The user terminals 102a-102n may include cellular telephones (sometimes called "smart phones"), tablet computers, laptop computers, and other types of electronic communication devices configured for processing applications.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

Each of the user terminals 102a-102n (individually referred to as "user terminal 102") may include an instrument encapsulation module 108 that operates to generate reports containing performance metrics for an application program 106 ("application") processed by a processor of the user terminal 102 and characteristic dimensions having values characterizing the application 106 and the user terminal 102. The instrument encapsulation module 108 may "wrap around" the application program 106 to intercept or otherwise observe application programming interface (API) calls from the application program 106 to other application programs 104 processed by the user terminal 102, an operating system 110 processed by the user terminal 102, and/or other software/hardware resources of the user terminal 102.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

Figure 2A:
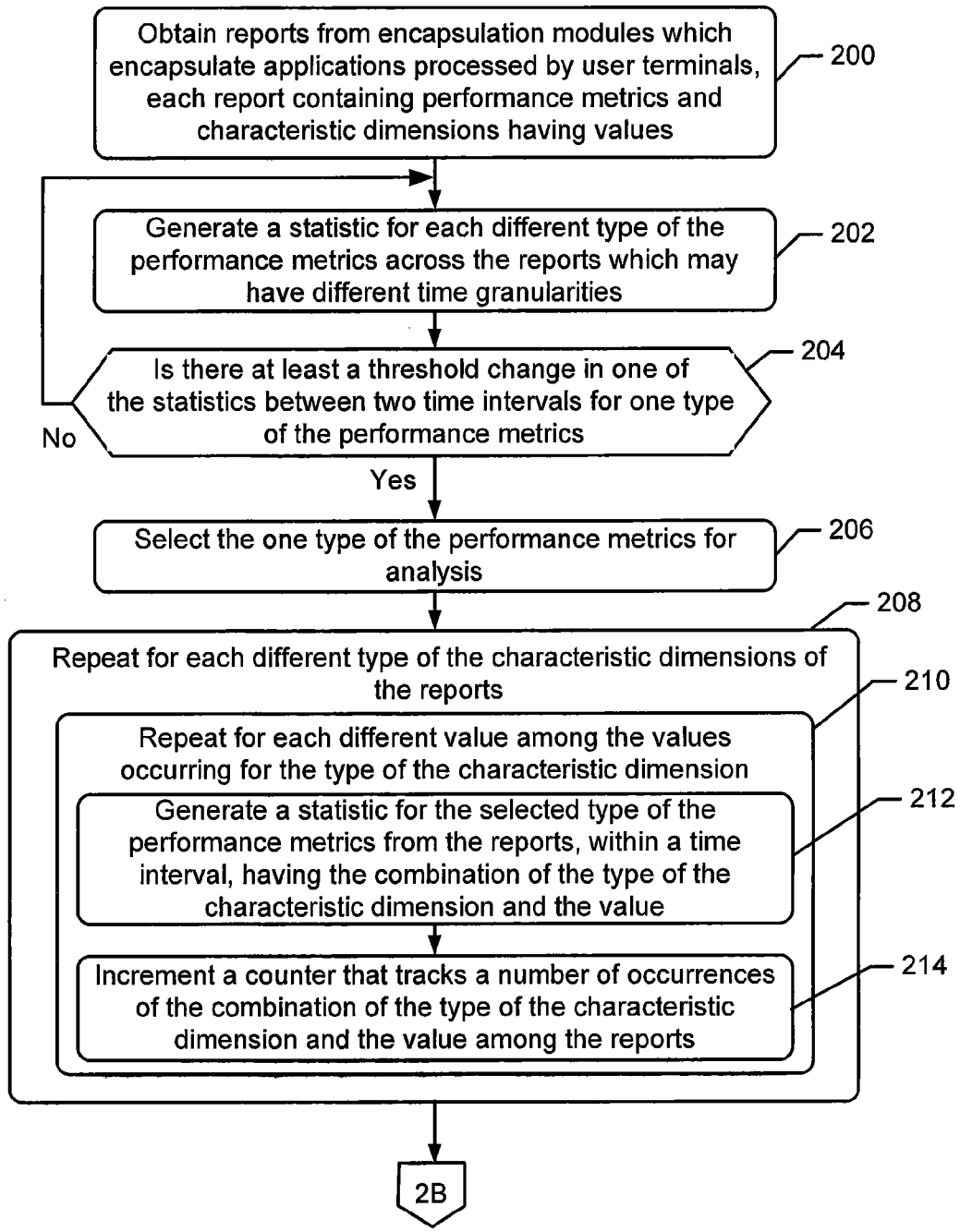
FIGS. 2a and 2b illustrate a flowchart of operations that may be performed by an application analysis computer to manage active warnings based on statistics from combinations of different reported types of characteristic dimensions and values, in accordance with some embodiments of the present disclosure.
Figure 2B:
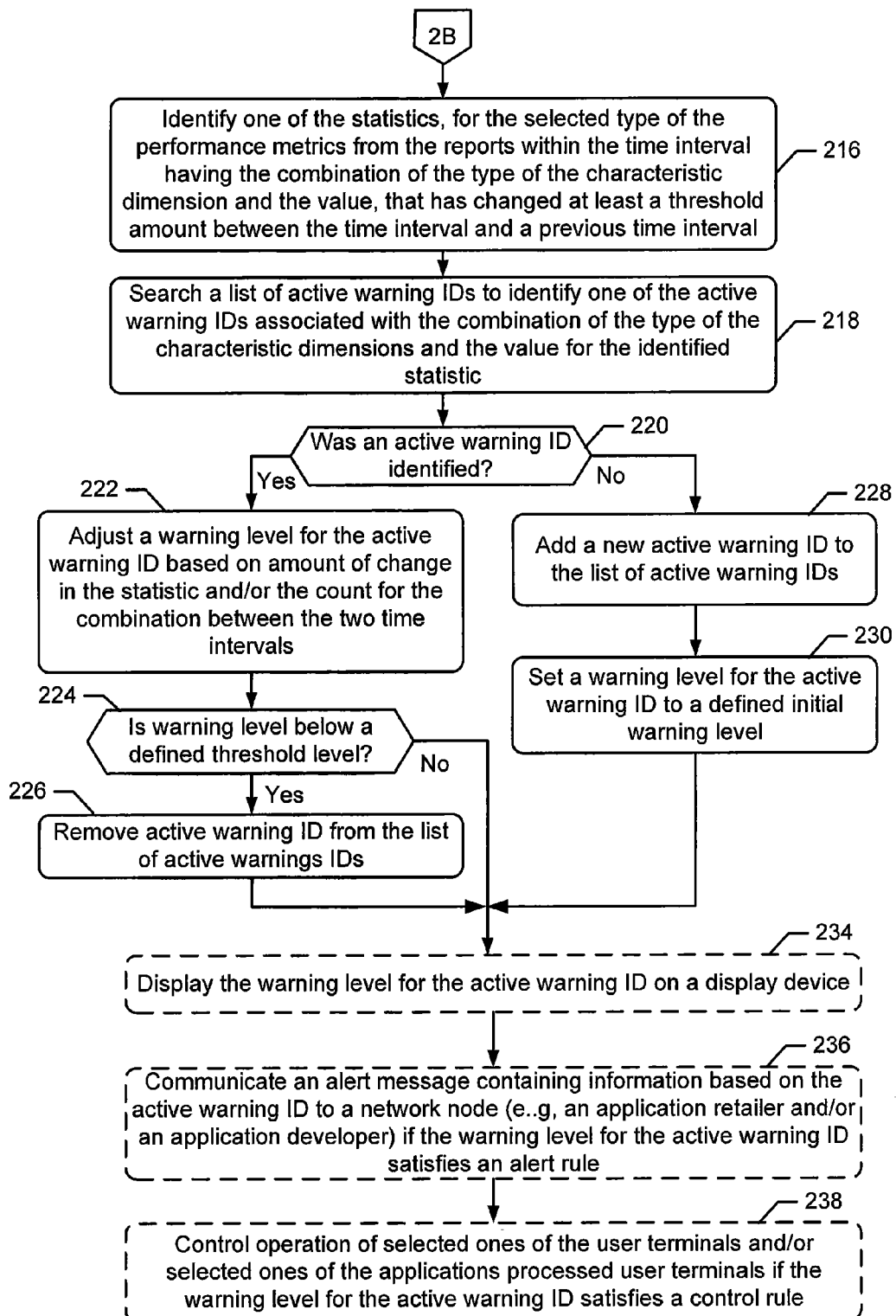

FIGS. 2a-2b illustrate a flowchart of operations that may be performed by the application analysis computer 150 to manage active warnings based on statistics from combinations of different types of characteristic dimensions and values reported by the user terminals 102a-n, in accordance with some embodiments of the present disclosure.

Referring to FIGS. 2a-2b, reports are obtained (block 200) from user terminals. The reports may be reported to the application analysis computer 150 by encapsulation modules that encapsulate applications processed by the user terminals 102a-n. In the example of FIG. 1, reports may be generated by the reporting encapsulation module 108 that encapsulates application program 106. The reporting encapsulation module 108 may generate reports at different time intervals, such as every minute, hour, day, week, month, or year, and the reporting time intervals may vary over time responsive to one or more defined conditions being satisfied and/or responsive to a command message from the application analysis computer 150 and/or the application server 140.

A report contains a performance metric for the application 106 processed by the user terminal 102 and characteristic dimensions having values characterizing the application 106 and the user terminal 102.

The performance metrics may include, but are not limited to, any one or more of the following types:

1. application program 106 utilization of user terminal 102 processor resources;
2. application program 106 utilization of user terminal 102 memory resources;
3. application program 106 utilization of user terminal 102 network interface resources;
4. application program 106 communication latency through the data network 120 and/or the radio access network 130;
5. communication latency between the application program 106 and the application program 104;
6. application program 106 response latency to defined input;
7. application program 106 wait time for receipt of user input;
8. rate of information displayed by the application program 106 on a display device of the user terminal 102;
9. duration of operational use of the application program 106 by the user;
10. time between instances of application program 106 use;
11. time of day and/or day or week of instances of application program 106 use;
12. velocity of the user terminal 102 while processing the application program 106;
13. control gestures or other inputs provided by a user as input to control application program 106 operation;
14. which features and/or sequences of features of the application program 106 are used;
15. how often features and/or sequences of features of the application program 106 are used;

16. number of features or levels of features of the application program 106 accessed or completed by a user;
17. events characterizing inefficient or ineffective operational use of the application program 106;
18. user selection of additional in-application features (e.g., download/activate);
19. user selection of other application programs (e.g., download/activate) while using the application program 106;
20. information characterizing data communications between the application program 106 and another application program, an operating system 110, and/or to other software/hardware resources of the user terminal;
21. events indicative of errors or undesirable operation of the application program 106; and
22. purchases made by users through the application program 106 (e.g., in-app purchases).

The characteristic dimensions and corresponding values (bracketed) may include, but are not limited to, any one or more of the following types:
1. location geographic coordinates (values among list of defined regions);
2. location city (values among list of defined cities);
3. location state (values among list of defined states);
4. location country (values among list of defined countries);
5. application identifier (values among list of defined identifiers);
6. application version (values among list of defined versions);
7. application functionality (values among list of defined functions);
8. application display update rate capabilities (values among list of defined capabilities);
9. application preferred or required memory capacity (values among list of defined capacities);
10. application preferred or required processor capacity (values among list of defined capacities);
11. application preferred or required network communication capacity (values among list of defined capacities);
12. application preferred or required co-executed other application(s) (values among list of defined applications);
13. user terminal identifier (values among list of defined identifiers);
14. user terminal manufacturer (values among list of defined manufacturer identifiers);
15. user terminal model (values among list of defined models);
16. user terminal processor type (values among list of defined types);
17. user terminal memory capacity (values among list of defined capacities);
18. user terminal communication capability (values among list of defined communication capabilities);
19. user terminal operating system type (values among list of defined types);
20. user terminal operating system version (values among list of defined versions);
21. user terminal display resolution (values among list of defined resolutions);
22. user terminal camera resolution (values among list of defined resolutions);
23. user terminal screen refresh rate capability (values among list of defined capabilities);
24. user terminal speaker volume capability (values among list of defined capabilities);
25. wireless carrier registered with user terminal (values among list of defined carriers);
26. wireless communication standard (values among list of defined standards);
27. user selected user-interface language (values among list of defined languages);
28. user information (values among list of defined names, attributes, etc.);
29. operational settings selected by the user for operation of the application program 106 and/or changes over time in the user selected operational settings;
30. gaming challenges or levels of the application program 106 selected by the user from among available challenges or levels;
31. other application programs active in background while user is using the application program 106; and
32. occurrence of one or more defined control gestures performed by the user through a user interface of the user terminal 102 to interface with the application program 106 and/or frequency of occurrence of the one or more defined control gestures.

Raw data contained in the reports can be stored in a memory, such as in a structured database residing across an array of networked data servers. Statistics are separately generated (block 202) for each different type of the performance metrics across the reports. A statistic may be generated by numerically combining (e.g., averaging) values of one type of performance metrics in all reports received during a time interval, another statistic may be generated by numerically combining (e.g., averaging) values of another type of performance metrics in all reports received during a time interval, etc.

The application analysis computer 150 may generate a separate statistic for each different one of the types of the performance metrics contained in the report. For example, one statistic can be generated for the application program 106 utilization of user terminal 102 processor resources, another statistic can be generated for the application program 106 utilization of user terminal 102 memory resources, another statistic can be generated for the application program 106 utilization of user terminal 102 network interface resources, another statistic can be generated for purchases made by users through the application program 106, and so on with other statistics being separately generated for each of the other 19 above-enumerated other types of performance metrics received as information within one or more of the reports. A statistic may be generated by numerically combining (e.g., averaging) values of one of types of the performance metrics in all of the reports (e.g., block 202) or in only reports having a defined combination of the characteristic value and the value (e.g., block 212), which are received during one of the time intervals. Resource utilization may be reported in one or more of the reports as a numerical value (e.g., a percentage value, as an indicated resource level among a plurality of defined resource levels, etc.) or as a textual string.

A determination (block 204) is made whether there is at least a threshold change in one of the statistics between two time intervals for one type of the performance metrics. If so, that statistic is identified and that one type of the performance metrics is selected for analysis. Although the operations of FIGS. 2a-2b are described for ease of explanation in the context of a single type of the performance metrics being selected (block 206), in some other embodiments more than one type of the performance metrics is selected based on observing changes with those types of performance metrics.

For each combination of a different type of the characteristic dimensions (operational loop indicated by block 208) and a different value among the values occurring for the type of the characteristic dimension (operational loop indicated by block 210), a statistic is generated (block 212) for the selected type of the performance metrics from the reports, within a time interval, having the combination of the type of the characteristic dimension and the value, and a counter is incremented (block 214) that tracks a number of occurrences of the combination of the type of the characteristic dimension and the value among the reports. The statistic may be generated (block 212) based on numerically combining values for the selected type of the performance metrics from the reports, within the time interval, which have (contain) the combination of the type of the characteristic dimension and the value.

In the operational loops indicated by blocks 208 and 210, for each combination of a different type of the characteristic dimensions and a different value among the values occurring for the type of the characteristic dimension, a statistic can be generated for the selected type of the performance metrics from the reports, within a time interval, having the combination of the type of the characteristic dimension and the value, operations that include selecting a combination of one of the types of the characteristic dimensions from among the different types of the characteristic dimensions and one of the values from among the different values occurring for the one of the types of the characteristic dimension. The operations further include generating a combined statistic based on numerically combining the selected type of the performance metrics associated from the reports, within the time interval, having the selected combination, and repeating the selecting a combination and the generating a combined statistic for other combinations of the types of the characteristic dimensions and the values among the reports within the time interval, wherein each of the combined statistics is associated with a different one of the combinations.

In one particular illustrative example, a statistic may be generated (block 212) for application program utilization of a user terminal processor resources (e.g., the selected (block 206) performance metrics for analysis) from all of the reports by the user terminals 102a-n within a defined timeframe containing dimensions and values for iPad 2 (e.g., dimension terminal type and value corresponding to iPad 2), Wi-Fi+cellular (e.g., dimension user terminal communication capability and value corresponding to Wi-Fi+cellular), 16 MByte memory (e.g., dimension user terminal memory capacity and value corresponding to 16 MByte), IOS 8 (e.g., dimension user terminal operating system type and value corresponding to IOS 8), application ID (e.g., dimension application identifier and value for ID), application version X (e.g., dimension application version and value for X), AT&T cellular service (e.g., dimension wireless carrier registered with user terminal and value for AT&T), and LTE air interface service (e.g., dimension wireless communication standard and value for LTE). Another statistic may be generated (block 212) for the application program 106 utilization of user terminal 102 processor resources (e.g., the selected (block 206) performance metrics for analysis) from all of the reports by the user terminals 102a-n within a defined timeframe containing dimensions and values as disclosed above in this paragraph except for having application version Y (e.g., dimension application version and value for Y) instead of application version X. Accordingly, two statistics will be separately determined for the particular combination of application programs utilization of user terminals 102a-n processor resources with the underlying difference in statistics being attributable to whether the reported utilization was from application version X (one statistic) or from application version Y (the other statistic).

It is noted that the statistics may be generated (block 212) and the counters can be incremented (block 214) from a single analysis pass through all of the report that were obtained (block 200), such as by processing the raw data from all of the reports that are associated with a particular time interval. The single pass approach may allow the application analysis computer 150 to process a tremendous number of reports from a tremendous number of combinations of differing application characteristics and user terminal characteristics using less expensive and/or reduced complexity hardware and software resources. Moreover, the operations can be run in real time as reports are received from the user terminals 102a-n.

Referring to the continuing operational flowchart shown in FIG. 2b, an operation identifies (block 216) one of the statistics, for the selected type of the performance metrics from the reports within the time interval having the combination of the type of the characteristic dimension and the value, that has changed at least a threshold amount between the time interval and a previous time interval.

Further to the particular illustrative example above, the application analysis computer 150 may identify that the statistic for the application program utilization of user terminal 102 processor resources for the characteristic dimensions and the values as described above with application version Y, has changed at least a threshold amount between a present time interval and an immediately preceding time interval. The application analysis computer 150 can compare the combination of characteristic dimensions and the values associated with the statistic that did not change the threshold amount to the combination of the characteristic dimensions and the values associated with the statistic that did change the threshold amount to identify that both statistics have the same characteristic dimensions and the values for the following: iPad 2 (e.g., dimension terminal type and value corresponding to iPad 2), Wi-Fi+cellular (e.g., dimension user terminal communication capability and value corresponding to Wi-Fi+cellular), 16 MByte memory (e.g., dimension user terminal memory capacity and value corresponding to 16 MByte), IOS 8 (e.g., dimension user terminal operating system type and value corresponding to IOS 8), application ID (e.g., dimension application identifier and value for ID), AT&T cellular service (e.g., dimension wireless carrier registered with user terminal and value for AT&T), and LTE air interface service (e.g., dimension wireless communication standard and value for LTE). The application analysis computer 150 can furthermore determine through the comparison of the combination of characteristic dimensions and the values associated with the statistic that did not change the threshold amount to the combination of the characteristic dimensions and the values associated with the statistic that did change the threshold amount that the two statistics are associated with different application versions (version X versus version Y). The application analysis computer 150 can determine therefrom that version Y of application ID being processed on the user terminal having the defined characteristics and serviced by the identified service provider and air interface service may have problematic operation because of its excessive utilization of processor resources, such as when compared to operation of version X of application ID.

A list of active warning IDs is searched (block 218) to identify one of the active warning IDs associated with the combination of the type of the characteristic dimension and the value for the identified statistic. A determination operation determines (block 220) whether an active warning ID was identified.

Based on identifying (block 220) an active warning ID, a warning level for that active warning ID is adjusted (block 222) based on an amount of change in the identified statistic between the time interval and another time interval and/or based on the counter associated with the combination of the type of the characteristic dimension and the value for the identified statistic. The other time interval may immediately precede the time interval so that warning levels are adjusted in real-time responsive to threshold changes in the identified statistic. The warning level may be adjusted (block 222) by increasing or decreasing the warning level. The operations determine (block 224) whether the warning level is below a defined threshold level and, if so, the active warning ID is removed (block 226) from the list of active warning IDs.

Further to the particular illustrative example above, the application analysis computer 150 may identify an active warning ID associated with the version Y of application ID and increase its warning level responsive to continued observe of reported excessive processor utilization in a series of time intervals. One of the counters can be used to track how many reports excessive processor utilization for the particular combination of the characteristic dimension and values for the version Y of application ID have occurred within a time interval and/or across a series of time intervals.

If no active warning ID is identified (block 220), a new active warning ID is added (block 228) to the list of active warning IDs with a recorded logical association to the combination of the type of the characteristic dimension and the value for the identified statistic. A warning level for the active warning ID is set (block 230) to a defined initial warning level (e.g., zero warning level).

Although the operations of blocks 216-230 are described for ease of explanation in the context of a single one of the statistics being identified (block 216) and a corresponding active warning ID being identified (block 218) or created (block 228), in some other embodiments the operations of blocks 216-230 can be used to identify a plurality of statistics for selected types of the performance metrics from the reports within the time interval having defined combinations of types of the characteristic dimension and values, that have changed at least by various defined threshold amounts between the time interval and a previous time interval. Similarly, a plurality of active warning IDs may be identified (block 218) within the list which are associated with the combinations of the types of the characteristic dimensions and the values for the identified statistics.

The application analysis computer 150 can operate to communicate information based on the identified one of the active warning IDs. For example, the warning level for the active warning ID may be displayed (block 234) on a display device communicatively connected to the application analysis computer 150. In the above particular illustrative example, a warning ID may be associated with version Y of application ID, which may cause a notification to be displayed and the associated warning level (e.g., "alert—version Y of application ID has warning level urgent (5)").

An alert message containing information defined based on presence of the active warning ID and/or the warning level of active warning ID may be communicated (block 236) to a network node of the system 100. For example, the alert message may be communicated (block 236) to an application retailer associated with an application server (collectively referred to as the application server 140) and/or to an application developer responsible for developing the application 106, via the data network 120. The alert message may contain information defined based on one of the dimensions and one of the values associated with the combination of the type of the characteristic dimension and the value that has been determined (block 216) to have changed at least the threshold amount.

The alert message may alternatively or additionally contain information based on the combination of the type of the characteristic dimension and the value for the identified statistic, and the alert message can be communicated to ones of the user terminals from which reports were obtained having the combination of the type of the characteristic dimension and the value for the identified statistic. Generation of the alert message may be selectively carried out based on the counter associated with the combination of the type of the characteristic dimension and the value for the identified statistic. For example, when the counter indicates that a threshold number of different user terminals have provided reports containing the type of the characteristic dimension and the value associated with the identified statistic, the application analysis computer 150 can respond by generating the alert message, which can be communicated to the application server 140, selected ones of the user terminals 102*a-n* (e.g., particular ones of the user terminals from which reports were obtained having the combination of the type of the characteristic dimension and the value for the identified statistic), and/or to another network node of the system 100.

The application server 140 may respond to the alert message by disabling further download of a particular application program to particular ones of the user terminals 102*a-n* that are identified based on information contained in the alert message (e.g., based on the characteristic dimension and the value), and/or by generating a message to the particular ones of the user terminals 102*a-n* offering an alternative version of the particular application program and/or a substitute application program for replacing the particular application program. The application analysis computer 150 may report the counter(s) in the alert message for use by the application server 140 to determine whether, for example, a sufficient number of instances of the identified application operations (e.g., problems) have been identified such that a remedial action or other action should be initiated.

In the above particular illustrative example, the alert message may warn the application server 140 to cease downloading version Y of application ID, and instead substitute version X of application ID. The application server 140 may use other information within the alert message which identifies other characteristic dimensions and values identified above to cease downloading version Y or application ID only with respect to user terminals having characteristics defined by one or more of the following that may be selected by the application server 140 and/or by the application analysis computer 150 and identified within the alert message: iPad 2, Wi-Fi+cellular, 16 MByte memory, IOS 8, and AT&T cellular service.

Still alternatively or additionally, the application analysis computer 150 may control (block 238) operation of selected ones of the user terminals and/or selected ones of the applications responsive to the warning level for the active warning ID satisfying a control rule. For example, the application analysis computer 150 may identify particular ones of the user terminals 102*a-n* and/or a particular application based on the combination of the type of the characteristic dimensions in the value for the identified statistic. The application analysis computer 150 can then communicate a command message(s) that is addressed to the identified ones of the user terminals 102a-n and containing information that identifies the particular application and may further identify a problematic operation associated with the particular application and/or a notification that is to be displayed to users. When the application analysis computer 150 communicates a command message(s) to selected ones of the user terminals 102a-n, the instrument encapsulation module 108 can responsively adapt operation of the application program 106 based on the command, such as to disable operation of the application program 106 and/or to display a message on a display device of the selected user terminals 102 to warn users of problematic operation of the identified application.

In the above particular illustrative example, the application analysis computer 150 may select to send a command message to only ones of the user terminals 102a-n having characteristics defined by one or more of the following that may be selected by the application server 140: iPad 2, Wi-Fi+cellular, 16 MByte memory, IOS 8, application ID, application version Y, and AT&T cellular service. The application analysis computer 150 may use the counter associated with this combination of characteristic dimensions and values to determine when a threshold number of user terminals having this combination of characteristics has reported excessive processor utilization so that an action should be taken to control those user terminals (e.g., cause the user terminals to display a notification and/or to disable operation of version Y of application ID).

As explained above, each report can contain a performance metric for the application program 106 being processed by the user terminal 102, and characteristic dimensions having values characterizing the application program 106 and/or the user terminal 102. The performance metrics may be generated by the reporting encapsulation module 108 which encapsulates the application program 106 to monitor operation of a present instance of the application program 108 processed by the user terminal 102 and related utilization of resources of the user terminal 102. The characteristic dimensions may characterize features and other characteristics of the application program 106 and the user terminal 102 which may be separate or independent from how a present instance of the application program 106 is presently operating while processed by the user terminal 102.

Figure 3:
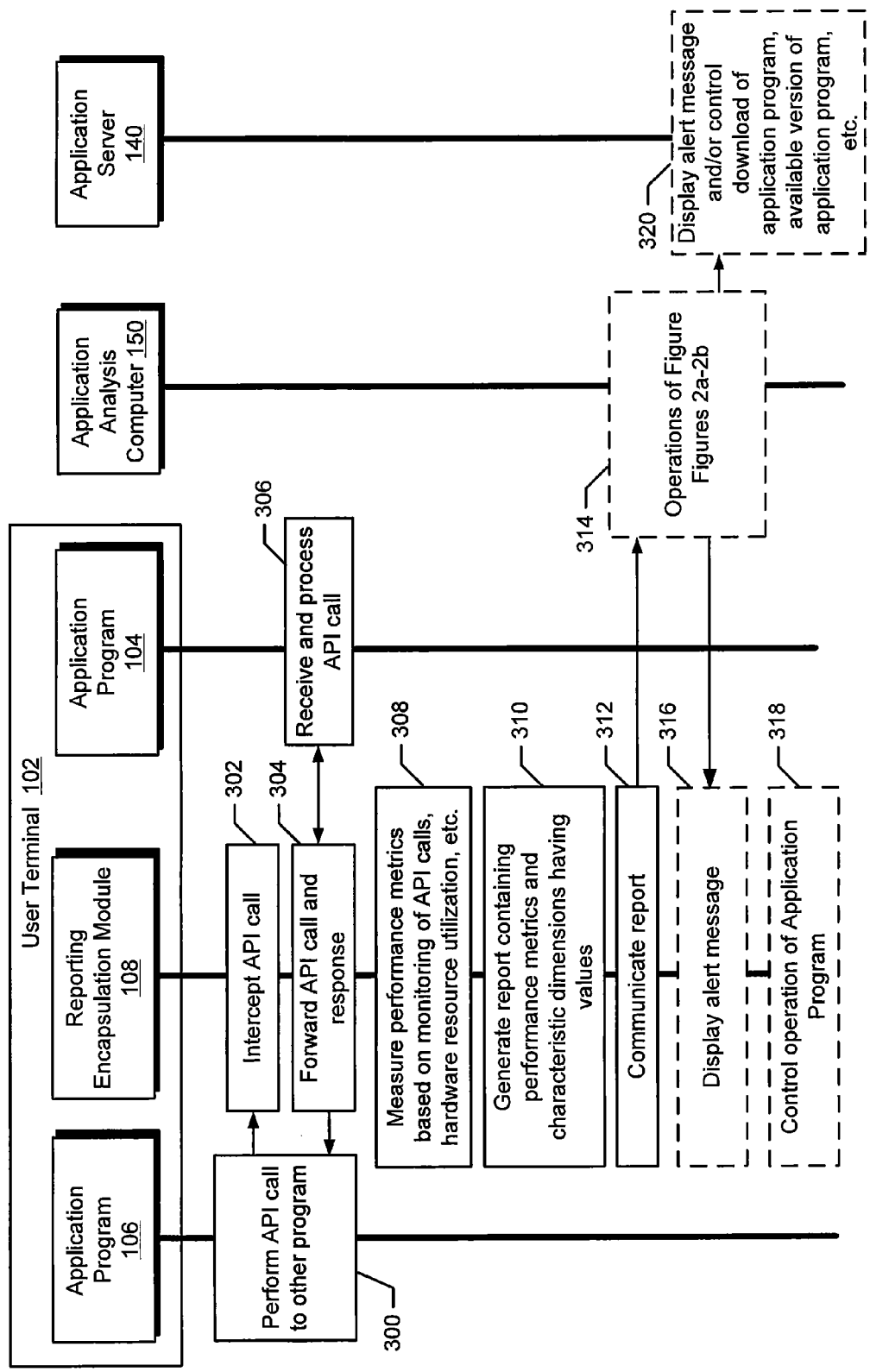
FIG. 3 is a combined data flow diagram and flowchart of operations by a user terminal, an application analysis computer, and an application server in accordance with some embodiments of the present disclosure.

FIG. 3 is a combined data flow diagram and flowchart of operations by a user terminal 102, the application analysis computer 150, and the application server 140 in accordance with some embodiments of the present disclosure.

Referring to FIG. 3, the application program 106 performs an API call (block 300) to the other application program 104. The reporting encapsulation module 108 intercepts (block 302) the API call. The reporting encapsulation module 108 forwards (block 304) the API call to the other application program 104, which receives and processes (block 306) the API call. The other application program 104 may communicate a response message which is intercepted and forwarded (block 304) through the reporting encapsulation module 108 to the application program 106.

The reporting encapsulation module 108 measures (block 308) performance metrics based on monitoring the API calls, hardware resource utilization, etc, and generates (block 310) a report containing performance metrics and characteristic dimensions having values such as those \ described above. The report is communicated (block 312) toward the application analysis computer 150. The operations for measuring 308 may be performed continuously and the operations for generating reports and communicating reports may be performed repetitively according to a defined time interval. The defined time interval may vary over time responsive to occurrence of a condition defined by a rule and/or responsive to a message from the application analysis computer 150 and/or from the application server 140.

The application analysis computer 150 performs operations (block 314) shown in FIGS. 2a-2b in accordance with some embodiments. The application analysis computer 150 may communicate an alert message to the user terminal 102, and the user terminal 102 may display (block 316) a notification on a display device of the user terminal 102 based on content of the alert message and/or may control operation of the application program 106 and/or the application program 104 responsive to content of the alert message. The application analysis computer 150 may alternatively or additionally communicate an alert message to the application server 140, which may display (block 320) the notification on display device of the application server 140 and/or control (block 320) downloading of the application program, control which version of the application program is available for downloading, etc, such as described above.

Example User Terminal and Application Analysis Computer

Figure 4:
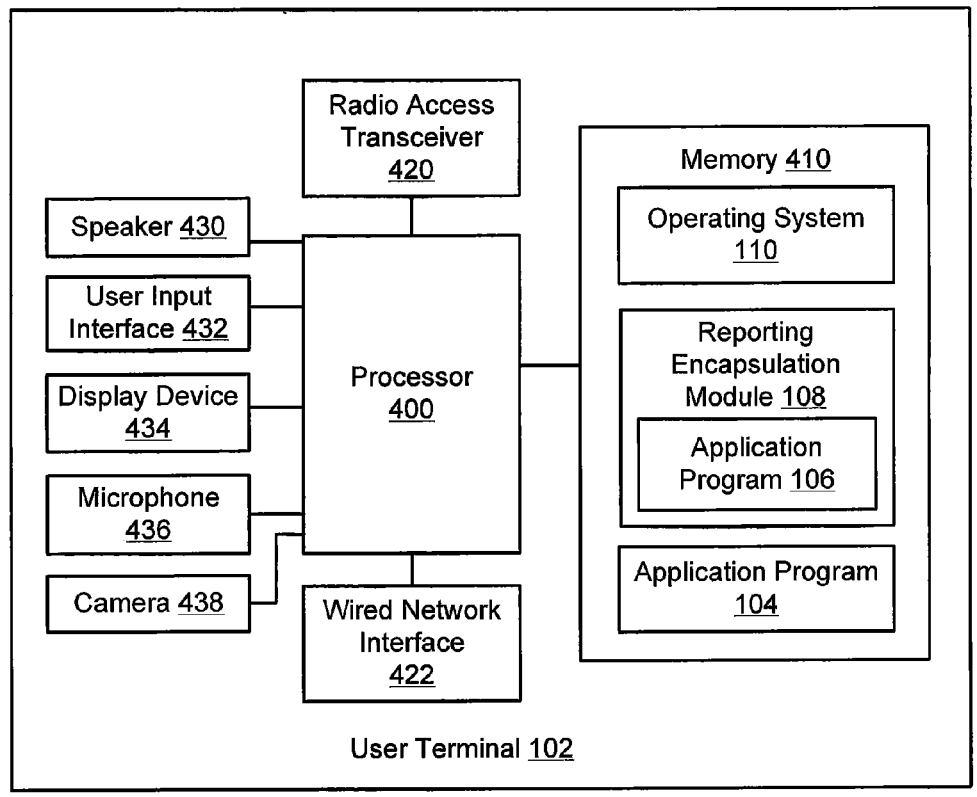
FIG. 4 is a block diagram of a user terminal configured according to some embodiments of the present disclosure.

FIG. 4 is a block diagram of a user terminal 102 configured according to some embodiments of the present disclosure. Referring to FIG. 6, the user terminal 102 includes a processor 400, a memory 410, and a network interface which may include a radio access transceiver 420 and/or a wired network interface 422 (e.g., Ethernet interface). The radio access transceiver 420 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 400 may include one or more data processing circuits, such as a general purpose and/or special purpose processor, such as a microprocessor and/or digital signal processor. The processor 400 is configured to execute computer program code in the memory 410, described below as a non-transitory computer readable medium, to perform at least some of the operations described herein as being performed by a user terminal. The computer program code may include an operating system 110, a plurality of application programs 104 and 106, and an instrument encapsulation module 108. The instrument encapsulation module 108 when executed by the processor 400 causes the processor 400 to perform operations in accordance with one or more embodiments disclosed herein. The user terminal 102 may further include a speaker 430, a user input interface 432 (e.g., touch screen, keyboard, keypad, etc.), a display device 434, a microphone 436, and a camera 438. As used herein, the term "user terminal" may include a cellular radiotelephone, satellite radiotelephone, a gaming console, a smart appliance, a tablet computer, a laptop computer, and/or a desktop computer.

Figure 5:
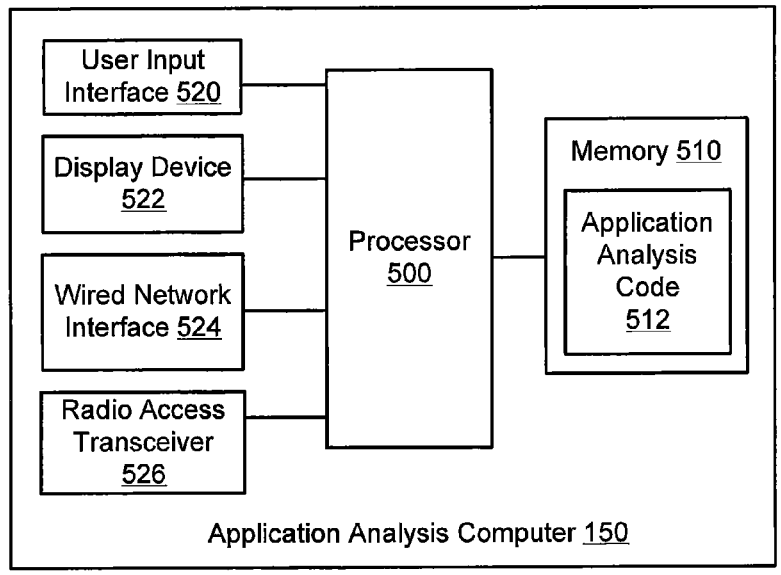
FIG. 5 is a block diagram of an application analysis computer configured according to some embodiments of the present disclosure.

FIG. 5 is a block diagram of an application analysis computer 150 configured according to some embodiments of the present disclosure. The application analysis computer 150 includes a processor 500, a memory 510, and a network interface which may include a radio access transceiver 526 and/or a wired network interface 524 (e.g., Ethernet interface). The radio access transceiver 526 can include, but is not limited to, a LTE or other cellular transceiver, WLAN transceiver (IEEE 802.11), WiMax transceiver, or other radio communication transceiver configured to communicate with the user terminal 102 via a radio access network.

The processor 500 may include one or more data processing circuits, such as a general purpose and/or special purpose processor (e.g., microprocessor and/or digital signal processor) that may be collocated or distributed across one or more networks. The processor 500 is configured to execute computer program code in the memory 510, described below as a non-transitory computer readable medium, to perform at least some of the operations described herein as being performed by an application analysis computer. The computer program code may include application analysis code 512 that when executed by the processor 500 causes the processor 500 to perform operations in accordance with one or more embodiments disclosed herein for the application analysis computer 150. The application analysis computer 150 may further include a user input interface 520 (e.g., touch screen, keyboard, keypad, etc.) and a display device 522.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product, comprising:
   a non-transitory computer readable storage medium comprising computer readable program code embodied in the medium that when executed by a processor of an application analysis computer causes the processor to perform operations comprising:
      obtaining from user terminals, reports containing performance metrics for applications processed by user terminals and characteristic dimensions having values characterizing the applications and the user terminals;
      generating a statistic separately for each different type of the performance metrics across the reports;
      identifying one of the statistics, for one type of the performance metrics, that has changed at least a threshold amount between two time intervals;
      selecting the one type of the performance metrics for analysis;
      for each combination of a different type of the characteristic dimensions and a different value among the values occurring for the type of the characteristic dimension,
         generating a statistic for the selected type of the performance metrics from the reports, within a time interval, having the combination of the type of the characteristic dimension and the value, and
         incrementing a counter that tracks a number of occurrences of the combination of the type of the characteristic dimension and the value among the reports;
      identifying one of the statistics, for the selected type of the performance metrics from the reports within the time interval having the combination of the type of the characteristic dimension and the value, that has changed at least a threshold amount between the time interval and a previous time interval;
      searching a list of active warning IDs to identify one of the active warning IDs associated with the combination of the type of the characteristic dimension and the value for the identified statistic; and
      communicating information based on the identified one of the active warning IDs.

2. The computer program product of claim 1, further comprising:
   adjusting a warning level of the identified one of the active warning IDs based on an amount of change in the identified statistic between the time interval and another time interval and/or based on the counter associated with the combination of the type of the characteristic dimension and the value for the identified statistic; and
   displaying the warning level of the identified one of the active warning IDs.

3. The computer program product of claim 2, wherein the other time interval immediately precedes the time interval.

4. The computer program product of claim 2, further comprising:
   based on the warning level of the identified one of the active warning IDs, selectively performing operations to:
      generate an alert message containing information based on the combination of the type of the characteristic dimension and the value for the identified statistic; and
      communicate the alert message to a network node.

5. The computer program product of claim 4, wherein the network node comprises an application server.

6. The computer program product of claim 2, further comprising:
   based on the warning level of the identified one of the active warning IDs, selectively performing operations to:
      generate an alert message containing information based on the combination of the type of the characteristic dimension and the value for the identified statistic; and
      communicate the alert message to ones of the user terminals from which reports were obtained having the combination of the type of the characteristic dimension and the value for the identified statistic.

7. The computer program product of claim 1, further comprising:
based on the counter associated with the combination of the type of the characteristic dimension and the value for the identified statistic, selectively performing operations to:
generate an alert message containing information based on the combination of the type of the characteristic dimension and the value for the identified statistic; and
communicate the alert message to a network node.

8. The computer program product of claim 1, further comprising:
based on the counter associated with the combination of the type of the characteristic dimension and the value for the identified statistic, selectively performing operations to:
generate an alert message containing information based on the combination of the type of the characteristic dimension and the value for the identified statistic; and
communicate the alert message to ones of the user terminals from which reports were obtained having the combination of the type of the characteristic dimension and the value for the identified statistic.

9. The computer program product of claim 1, wherein for each combination of a different type of the characteristic dimensions and a different value among the values occurring for the type of the characteristic dimension,
the generating a statistic for the selected type of the performance metrics from the reports, within a time interval, having the combination of the type of the characteristic dimension and the value, comprises:
selecting a combination of one of the types of the characteristic dimensions from among the different types of the characteristic dimensions and one of the values from among the different values occurring for the one of the types of the characteristic dimension;
generating a combined statistic based on numerically combining the selected type of the performance metrics associated from the reports, within the time interval, having the selected combination; and
repeating the selecting a combination and the generating a combined statistic for other combinations of the types of the characteristic dimensions and the values among the reports within the time interval, wherein each of the combined statistics is associated with a different one of the combinations.

10. The computer program product of claim 1, wherein the generating a statistic, comprises:
numerically combining values for the selected type of the performance metrics from the reports, within the time interval, having the combination of the type of the characteristic dimension and the value.

11. The computer program product of claim 1, wherein the selected type of the performance metrics from the reports, comprises values indicating user terminal processor utilization while processing an application.

12. The computer program product of claim 1, wherein the selected type of the performance metrics from the reports, comprises values indicating user terminal memory utilization while processing an application.

13. The computer program product of claim 1, wherein the selected type of the performance metrics from the reports, comprises values indicating response latency by an application while processed by a user terminal.

14. The computer program product of claim 1, wherein the selected type of the performance metrics from the reports, comprises values indicating user terminal network communication utilization by an application while processed by a user terminal.

15. The computer program product of claim 1, wherein the selected type of the performance metrics from the reports, comprises values indicating duration of operational use of an application by a user.

16. The computer program product of claim 1, wherein the selected type of the performance metrics from the reports, comprises values indicating purchases made by a user through an application processed by a user terminal.

17. The computer program product of claim 1, wherein the characteristic dimensions in at least some of the reports characterize a city, a state, and a country where the user terminals which generated those reports were located when the reports were communicated to the application analysis computer.

18. The computer program product of claim 1, wherein the characteristic dimensions in at least some of the reports identify one of the applications and identify a version of the one of the applications processed by the user terminals which generated those reports when the reports were communicated to the application analysis computer.

19. The computer program product of claim 1, wherein the characteristic dimensions in at least some of the reports identify for each of the user terminals which generated those reports, user terminal identifiers, user terminal operating system types, user terminal operating system versions, and user terminal wireless carrier identifiers.

20. A method comprising:
performing operations as follows on a processor of an application analysis computer:
receiving from user terminals, reports containing performance metrics for applications processed by user terminals and characteristic dimensions having values characterizing the applications and the user terminals;
generating a statistic for each different type of the performance metrics across the reports;
identifying one of the statistics, for one type of the performance metrics, that has changed at least a threshold amount between two time intervals;
selecting the one type of the performance metrics for analysis;
for each combination of a different type of the characteristic dimensions and a different value among the values occurring for the type of the characteristic dimension,
generating a statistic for the selected type of the performance metrics from the reports, within a time interval, having the combination of the type of the characteristic dimension and the value, and
incrementing a counter that tracks a number of occurrences of the combination of the type of the characteristic dimension and the value among the reports;
identifying one of the statistics, for the selected type of the performance metrics from the reports within the time interval having the combination of the type of the characteristic dimension and the value, that has changed at least a threshold amount between the time interval and a previous time interval;
searching a list of active warning IDs to identify one of the active warning IDs associated with the combination of the type of the characteristic dimension and the value for the identified statistic; and communicating information based on the identified one of the active warning IDs.

* * * * *